United States Patent [19]

Imai et al.

[11] Patent Number: 5,342,920
[45] Date of Patent: Aug. 30, 1994

[54] PROCESS FOR THE PREPARATION OF POLYARYLENE SULFIDE AND AN APPARATUS FOR THE PREPARATION THEREOF

[75] Inventors: Yoichi Imai, Icihara; Toshiyuki Hirano, Kimitsu; Osamu Komiyama; Hidenori Yamanaka, both of Icihara, all of Japan

[73] Assignee: Tonen Chemical Corporation, Tokyo, Japan

[21] Appl. No.: 992,860

[22] Filed: Dec. 16, 1992

[30] Foreign Application Priority Data

Dec. 17, 1991 [JP] Japan ................... 3-352990
Oct. 7, 1992 [JP] Japan ................... 4-291908
Oct. 7, 1992 [JP] Japan ................... 4-291909
Nov. 18, 1992 [JP] Japan ................... 4-331264

[51] Int. Cl.$^5$ ............................... C08G 75/16
[52] U.S. Cl. ........................ 528/388; 422/138
[58] Field of Search ................ 528/388; 422/138

[56] References Cited

U.S. PATENT DOCUMENTS

| | | | |
|---|---|---|---|
| 4,433,138 | 2/1984 | Idel et al. | 528/388 |
| 4,645,826 | 2/1987 | Iizuka et al. | 525/537 |
| 5,093,469 | 3/1992 | Senga | 528/388 |
| 5,109,110 | 4/1992 | Ogata | 528/388 |
| 5,194,580 | 3/1993 | Koyama et al. | 528/388 |

FOREIGN PATENT DOCUMENTS 0126369 2/1981 European Pat. Off. .
0065689 3/1983 European Pat. Off. .

OTHER PUBLICATIONS

Database WPI; Derwent Publications Ltd., London, GB, AN 80-23476 & SU-A-676 597 (Elementorganic Fusi) Jul. 30 1979 *abstract*.
European Search Report Application No. EP 92 20 3964 dated Mar. 29, 1993 and Communication No. 92203964.9 dated Apr. 22, 1993.

Primary Examiner—Melvyn I. Marquis
Assistant Examiner—H. Lee
Attorney, Agent, or Firm—Kane, Dalsimer, Sullivan, Kurucz, Levy, Eisele and Richard

[57] ABSTRACT

High molecular weight polyarylene sulfide prepared by reacting an alkali metal sulfide with a dihaloaromatic compound in an organic amide solvent, wherein a gaseous phase part of a reactor is cooled to thereby condense a part of a gaseous phase in the reactor, and the condensed liquid is refluxed to a liquid phase in the reactor. Higher molecular weight is attained by copolymerization with 0.005 to 1.5 mole percent, based on the alkali metal sulfide, of a polyhaloaromatic compound.

5 Claims, 5 Drawing Sheets

PROCESS FOR THE PREPARATION OF POLYARYLENE SULFIDE AND AN APPARATUS FOR THE PREPARATION THEREOF

FIELD OF THE INVENTION

The present invention relates to a process for the preparation of polyarylene sulfide, particularly high molecular weight polyarylene sulfide, and an apparatus for the preparation thereof.

PRIOR ART

A basic process for the preparation of polyarylene sulfide (hereinafter referred to as PAS) is known where a dihaloaromatic compound is reacted with an alkali metal sulfide in an organic amide solvent (Japanese Patent Publication No. 3368/1970). The PAS prepared in this process had a low molecular weight and was, therefore, subjected to heat cross linking treatment to thereby yield high molecular weight. However, it is difficult to process the cross-linked PAS into films, sheets, fibers and the like.

Recently, high molecular weight PAS was made without heat cross linking. Films, sheets, fibers and the like prepared from such PAS have excellent mechanical properties. In injection molding, such PAS exhibits high flowability under low shearing velocity in melt processing. Such PAS is bright in color. For these reasons, a need for such PAS is increasing.

Various improved processes are known to prepare high molecular weight PAS solely by polymerization.

In a process described in Japanese Patent Publication No. 12240/1977, alkali metal carboxylates such as sodium acetate and lithium acetate are used as a polymerization aid in a conventional reaction system. However, production costs of PAS are higher in this process as a result and the process is very unfavorable commercially. A great deal of incidental facilities, technology and costs are required to separate and recover those alkali metal carboxylates from a product, and dispose of those without pollution, which makes the process further disadvantageous.

Japanese Patent Application Laid-Open (or Kokai) No. 7332/1986 discloses a process for the preparation of high molecular weight PAS, which is characterized in that reaction is conducted in two steps, and water is added in the second step. That is, reaction is conducted at 180° to 235° C. in the presence of 0.5 to 2.4 moles of water per mole of alkali metal sulfide to form PAS in a conversion of a dihaloaromatic compound of 50 to 98 mole % in the first step. In the second step, water is added and reaction is conducted at 245° to 290° C. in the presence of 2.5 to 7.0 moles of water.

Many other processes are also known to produce high molecular weight PAS by letting water present intentionally likewise. In a process described in Japanese Patent Application Laid-Open No. 39926/1988, reaction is conducted at 235° to 280° C. in the presence of 0.5 to 5 moles of water per kilogram of a solvent in a conversion of 70 to 98 mole % in a first step. In a second step, water is added and reaction is carried out at 240° to 290° C. in the presence of 6 to 15 moles of water. It is said that this process is characterized in that reaction temperature is higher and a water content is less in the first step, compared to those in the process of the aforesaid Japanese Patent Application Laid-Open No. 7332/1986, and that a large amount of water is added to cause liquid-liquid two layers separation in the second step.

A process is known where reaction is further performed after such liquid-liquid two layers separation. That is, in a process described in Japanese Patent Application Laid-Open No. 285922/1987, reaction is conducted at 180° to 235° C. in the presence of 0.5 to 2.4 moles of water per mole of alkali metal sulfide in a conversion of at least 80 mole % in a first step. In a second step, water is added and reaction is conducted at 245° to 290° C. in the presence of 2.5 to 7.0 moles of water and, then, stirring is stopped to cause two layers separation. In a third step, the lower layer (concentrated polymer solution layer) is further subjected to reaction at 245° to 350° C.

Water must be added in the middle of reaction in the aforesaid processes where a water content is changed in the middle of reaction to prepare high molecular weight PAS. In order to do this, there are only three alternatives, i.e., to once lower a temperature so as to reduce pressure to normal pressure and then add water; to change a reactor between a first step and a second step; or to inject water by pressure into a reactor which is at high temperature and pressure. However, these operations are disadvantageous in practice in terms of facilities, economy and manipulation. Besides, sodium sulfide is usually used in a concentration of 1 mole per 0.4 to 0.5 kg of a solvent (e.g. N-methyl pyrrolidone). When 2.5 moles or more of water per mole of sodium sulfide is present at a temperature of 245° C. or higher in a second step, pressure is so high as 20 kg/cm$^2$G or more. Therefore, a reactor must resist pressure of 30 kg/cm$^2$G or more in practice. Thus, it is impossible to apply facilities which were built for previous processes where no water is added in the middle course of reaction. Pressure resisting facilities are comparatively costly. Accordingly, a process which may be practiced at a lower pressure as previously is desirable. Further, operations at a pressure as low as possible is preferred from a point of view of safety.

Moreover, it is said that a high mole ratio of alkali metal sulfide to a dihaloaromatic compound, e.g., 0.980 to 1.01, is basically needed to prepare high molecular weight PAS solely by polymerization. When a polymerization temperature is raised at 230° C. or higher, a reaction system with a high mole ratio of alkali metal sulfide to a dihaloaromatic compound is unstable and high molecular weight PAS is not formed, or PAS once-formed may depolymerize to form lower molecular weight polymers and a noticeable amount of thiophenol.

It is known to use a polyhaloaromatic compound having three or more halogen substitutes in molecule to prepare high molecular weight PAS solely by means of polymerization. In a process described in Japanese Patent Publication 8719/1979, a polyhaloaromatic compound and lithium carboxylate or lithium chloride are added in a conventional reaction system. Expensive lithium carboxylate or lithium chloride should be used at an approximately equimolar ratio to alkali metal sulfide, which increases production costs of PAS and makes the process very disadvantageous commercially. Further, a great deal of incidental facilities, technology and costs are required to separate and recover lithium carboxylate or lithium chloride from a product without pollution, which makes the process further disadvantageous.

In a process described in Japanese Patent Publication 334/1982, a polyhaloaromatic compound, about 1.2 to 2.4 moles of water (including hydration water of alkali metal sulfide) per mole of alkali metal sulfide, or about 1.0 to 2.4 moles of water and sodium carboxylate are added in a conventional reaction system. According to the Examples, in the case where sodium carboxylate is not added, sufficiently high molecular weight PAS is not obtained unless at least 1.5 moles of water is present. When a water content in a system is so high, pressure in a reactor during reaction is high, which requires a high pressure-resisting reactor and, therefore, increases costs. On the other hand, in the case where sodium carboxylate is added, incidental facilities and technology are required to separate and recover it from a product and dispose of it without pollution, which increases costs.

SUMMARY OF THE INVENTION

A purpose of the invention is to provide an economical and convenient process for the preparation of high molecular weight polyarylene sulfide, wherein an expensive polymerization aid such as alkali metal carboxylates and lithium chloride are unnecessary, and polymerization is carried out with a constant, comparatively low water content in a reaction system in a low pressure reactor without necessity for incidental facilities such as a pressure injection device.

Another purpose of the invention is to provide an apparatus for the preparation of high molecular weight polyarylene sulfide.

The present inventors have closely examined polymerization mechanism in order to solve the aforesaid problems on the preparation of high molecular weight polyarylene sulfide, and have found that the aforesaid problems are solved by cooling a gaseous phase part of a reactor, whereby depolymerization of a formed polyarylene sulfide is also avoided.

The present invention is a process for the preparation of polyarylene sulfide by reacting an alkali metal sulfide with a dihaloaromatic compound in an organic amide solvent, characterized in that a gaseous phase part of a reactor is cooled to thereby condense a part of a gaseous phase in the reactor, and the condensed liquid is refluxed to an upper liquid phase in the reactor.

Preferably, 0.005 to 1.5 mole percent, based on the alkali metal sulfide, of a polyhaloaromatic compound is copolymerized to attain higher molecular weight polyarylene sulfide.

The invention also provides an apparatus for the preparation of polyarylene sulfide by the reaction of an alkali metal sulfide with a dihaloaromatic compound in an organic amide solvent, characterized in that the apparatus is provided with a means of cooling a gaseous phase part of a reactor to thereby condense a part of a gaseous phase in the reactor, and returning the condensed liquid to an upper liquid phase in the reactor.

DETAILED DESCRIPTION OF THE INVENTION

Figure 1:
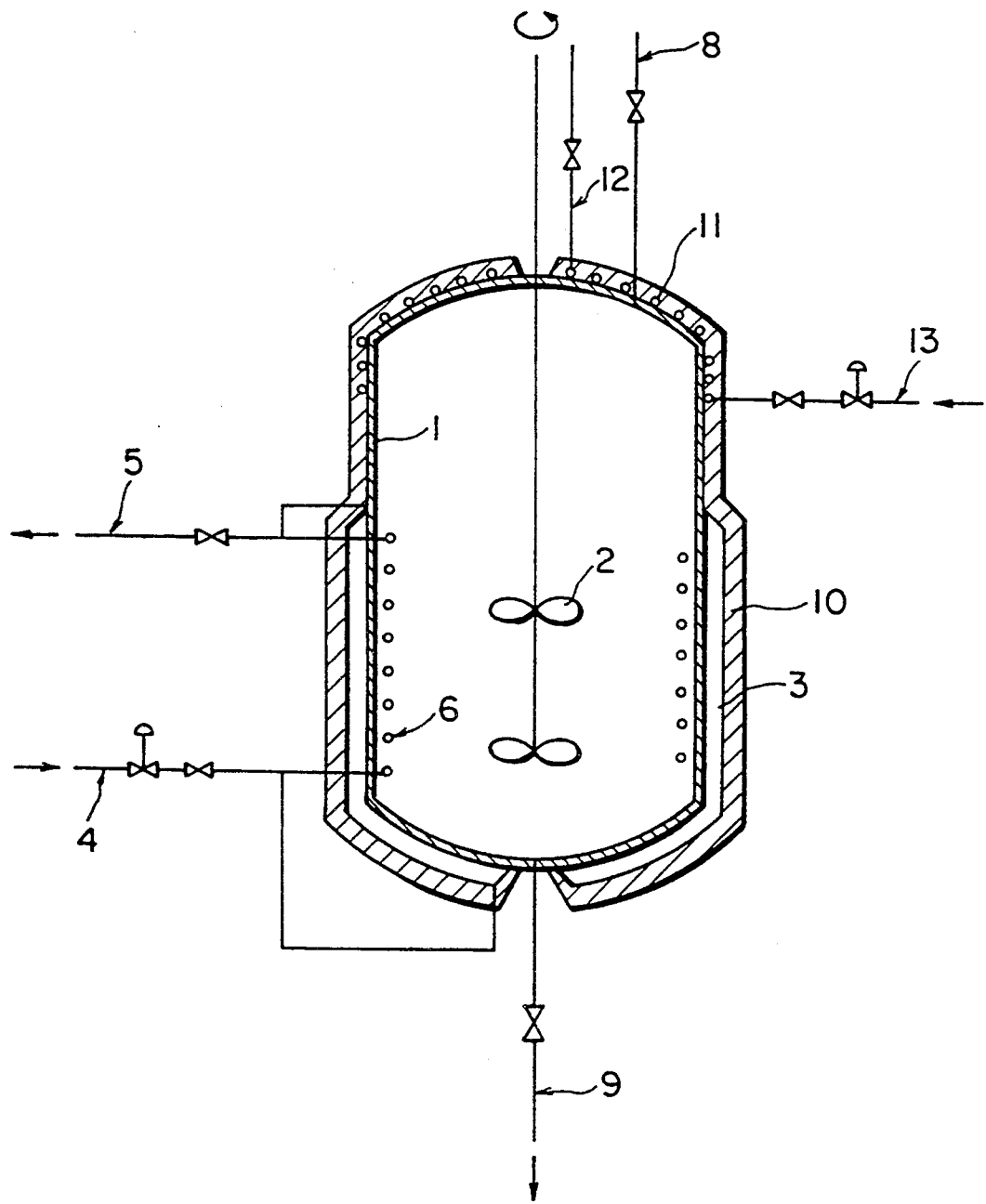
FIG. 1 is a schematic view of a reactor unit with an external cooling coil.

The condensed anti refluxed liquid has a higher water content compared to the liquid phase bulk, because of difference of vapor pressure between water and an amide solvent. This reflux with a higher water content creates a layer having a higher water content in the upper part of the reaction mixture. As a result, larger amounts of remaining alkali metal sulfide (e.g., $Na_2S$), alkali metal halide (e.g., NaCl) and oligomers are contained in this layer. In conventional processes, formed polyarylene sulfide, starting materials such as $Na_2S$ and by-products are mixed together homogeneously at a high temperature of 230° C. or higher. In such conditions, high molecular weight polyarylene sulfide is not formed and, moreover, even once formed polyarylene sulfide may be depolymerized to form lower molecular weight polymers and a noticeable amount of thiophenol as by-products. In the invention, it is believed that the aforesaid unfavorable phenomena may be avoided, factors which interfare with reaction may be excluded very effectively and high molecular weight polyarylene sulfide may be obtained by actively cooling the gaseous phase part of a reactor and returning a large amount of water-rich reflux to the upper part of the liquid phase. However, the invention should not be restricted by effects attained only by the aforesaid phenomena, but various effects cause by cooling the gaseous phase part may give to high molecular weight polyarylene sulfide.

Addition of water in the middle course of reaction is unnecessary in the invention, unlike in conventional processes, but such addition of water is not precluded. However, some of the advantages of the invention will be lost with operations of adding water. Accordingly, it is preferred that the whole water content in a polymerization system is constant in the course of reaction.

In general, polymerization of polyarylene sulfide is conducted in a temperature range of from 180° to 350° C., and a reactor must be heated. Accordingly, it was common to cover a reactor or a whole reaction apparatus with heat insulating materials for heat economy. In contrast, the gaseous phase part of a reactor is rather cooled in the invention. This is, of course, disadvantageous in heat economy, compared to the conventional ways, but the attained advantages more than make up for the disadvantage. A means of cooling the gaseous phase part of a reactor may be of external cooling or internal cooling, and preferably comprises (a) an external cooling coil coiled on an upper outer wall of the reactor, (b) an internal cooling coil mounted in an upper internal part of the reactor, (c) a coolant jacket mounted on an upper outer wall of the reactor, (d) a unit for spraying or blowing a liquid or gas directly to an upper outer wall of the reactor, or (e) a reflux condenser mounted, for instance, above the reactor. Any other means may also be applied as long as they have an effect of increasing an amount of a reflux in the reactor. It is unnecessary for such a cooling means to extend to the whole gaseous phase part of the reactor. If the cooling effect extends down to the liquid phase part, heat economy will be worsened. Accordingly, it is preferred to cool only an upper gaseous phase part and this is sufficient. When a surrounding temperature is comparatively low (e.g. normal temperature), proper cooling may be done by removing heat insulating materials from the upper part of a conventional reactor.

A water/amide solvent mixture condensed on the wall of a reactor or the wall of an interal cooling means may fall down along the wall to reach the upper part of the liquid phase in a reactor, or may be collected in any manner and led to the upper part of the liquid phase in a reactor.

Meanwhile, the temperature of a liquid phase bulk is maintained constant at a predetermined value, or controlled in accordance with a predetermined temperature profile. In the case where the temperature is constant, reaction is preferably carried out at a temperature of 230° to 275° C. for 0.1 to 20 hours, more preferably 240° to 265° C. for 1 to 6 hours. It is advantageous to apply a reaction temperature prefile having at least two steps in order to obtain higher molecular weight polyarylene sulfide. The first step is preferably conducted at a temperature of 195° to 240° C. If the temperature is lower, a reaction rate is too late to be practical. If it exceeds 240° C., a reaction rate is too fast to obtain sufficiently high molecular weight polyarylene sulfide and, moreover, a rate of side reaction increases noticeably. The first step is preferably ended at a time when a ratio of the remaining dihaloaromatic compound to the charged one in the polymerization system is 1 to 40 mole % and the molecular weight reaches a range of from 3,000 to 20,000, more preferably 2 to 15 mole % and a molecular weight range of from 5,000 to 15,000. If the ratio exceeds 40 mole %, side reacton such as depolymerization tends to occur in a subsequent second step. If it is less than 1 mole %, it is difficult to obtain high molecular weight polyarylene sulfide finally. Then, the temperature is increased and, in a final step, reaction is preferably carried out at a reaction temperature of 240° to 270° C. for 1 to 10 hours. If the temperature is lower, sufficiently high molecular weight polyarylene sulfide cannot be obtained. If the temperature exceeds 270° C., side reaction such as depolymerization tends to occur and it is difficult to stably prepare high molecular weight product.

In practice, a water content in alkali metal sulfide in an amide solvent is brought to a predetermined value by dehydration or addition of water at need in an atmosphere of inert gas. The water content is preferably 0.5 to 2.5 moles per mole of alkali metal sulfide. If it is less than 0.5 mole, the reaction rate is too fast and unfavorable reaction such as side reaction may occur. If it exceeds 2.5 moles, the reaction rate is too slow and, moreover, larger amounts of by-products such as phenol are seen in a filtrate after the reaction and a polymerization degree is smaller. A dihaloaromatic compound may be introduced in a reaction system at the beginning, or may be added during or after the adjustment of the water content. It is preferably used in an amount of 0.9 to 1.1 moles per mole of alkali metal sulfide to obtain high molecular weight polyarylene sulfide.

In the case of one step reaction at a constant temperature, cooling of the gaseous phase part during reaction should be started, at latest, below 250° C. in the middle course of temperature rise, but preferably started at the beginning of reaction. In the case of multi steps reaction, the cooling is preferably started in the middle course of temperature rise after a first step reaction, but more desirably started in a first step reaction. Pressure in a reactor is usually a most proper measure for a degree of a cooling effect. An absolute value of pressure depends upon characteristics of a reactor, stirring conditions, water content in a reaction system, mole ratio of a dihaloaromatic compound to alkali metal sulfide and so on. However, decreased reactor pressure, compared to that in the same reaction conditions except the absence of cooling, means that the amount of a reflux is increased and the temperature at the gas-liquid interface of a reaction solution is lowered. It is thought that a relative decrease in pressure indicates extent of separation between a layer with a larger water content and the remaining layer. Accordingly, the cooling should be done to such extent that an internal pressure in a reactor is lower than that of the case where the cooling is not conducted. A person skilled in the art may determine the extent of cooling, depending upon equipments used and operation conditions.

Polyarylene sulfide thus prepared may be separated from by-products and dried in known making-up procedures.

The invention will be explained in reference to the accompanying figures. FIG. 1 shows a reactor unit having a cooling coil wound on an upper external of a reactor. Materials for reaction are fed into a reactor 1 via conduit 8 to form a liquid phase which is stirred with a stirring means 2. The liquid phase part of the reactor 1 is covered with a heat medium jacket 3 where a heat medium flows in via conduit 4 and flows out via conduit 5. In the liquid phase part of the reactor, internal heating coil 6 is installed, in which a heat medium flows in and flows out. In the upper part of the reactor, nitrogen is introduced for pressurization via conduit 8, and drawn out for depressurization via conduit 8 again. When heat dehydration is carried out after sodium sulfide is charged, suction is applied via conduit 8. After completion of polymerization, a slurry containing polyarylene sulfide formed is drawn out via coduit 9.

On the upper external wall of the reactor, an external cooling coil 11 is wounded, in which a coolant of, for instance, 20° to 90° C., e.g. water, is introduced via conduit 13, under flow rate control by a control valve (not shown), and drawn out via conduit 12. Thus, the gaseous phase part (i.e. upper part) of the reactor is cooled, and a part of the gaseous phase is condensed, falls down along the wall of the reactor and refluxed into the liquid phase. The whole reactor is covered with heat insulating material 10.

Figure 2:
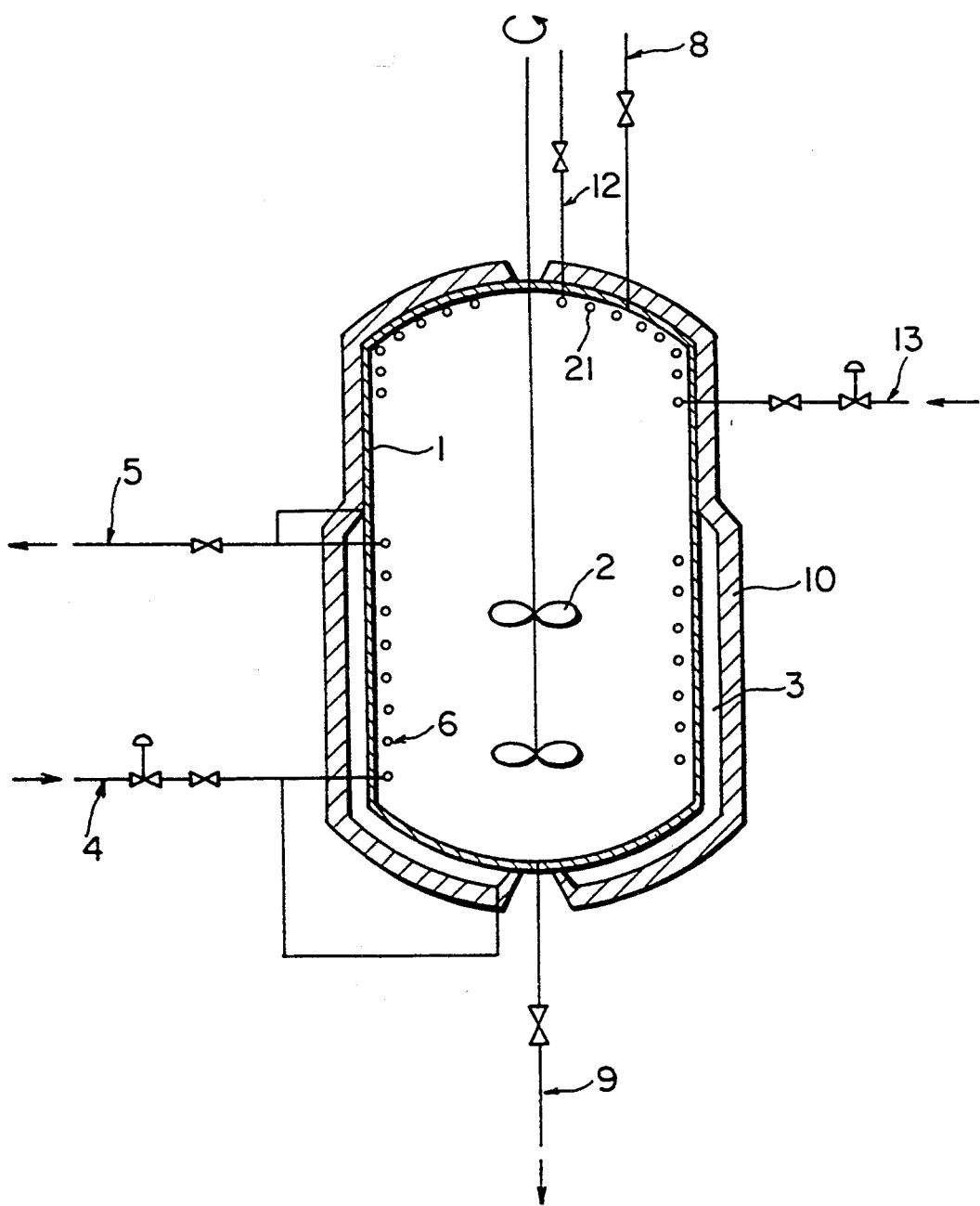
FIG. 2 is a schematic view of a reactor unit with an internal cooling coil.

FIG. 2 shows another embodiment where internal cooling coil 21 is installed in an upper inner part of a reactor 1. Numerals in FIG. 2 indicate the same parts as in FIG. 1. This applied to other figures. Liquid condensed on the surface of cooling coil 21 falls down along the cooling coil and then along the wall of the reactor and reaches a liquid phase. Alternatively, a trough may be arranged so as to receive falling droplets condensed on the surface of cooling coil 21 and introduce them to a liquid phase.

Figure 3:
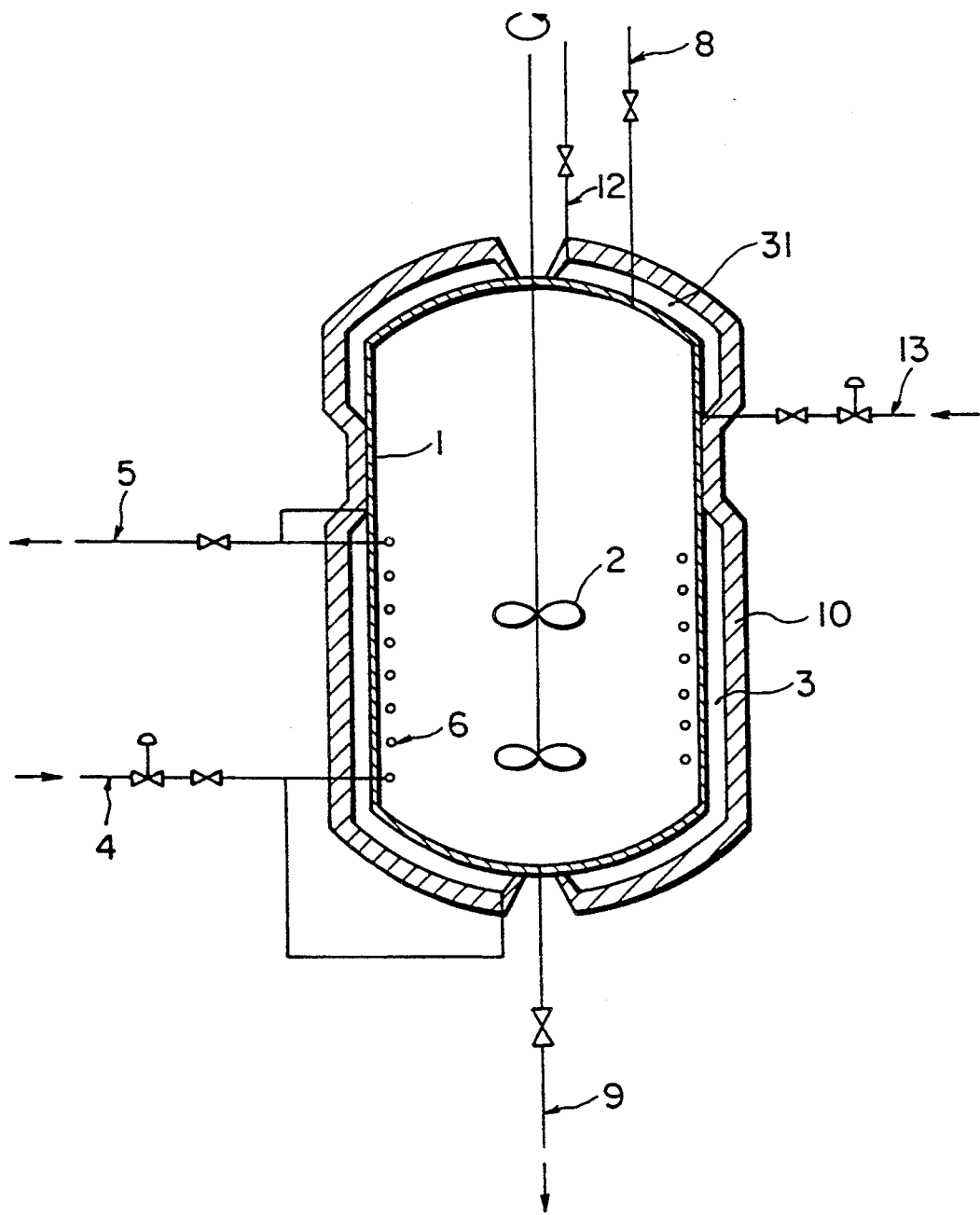
FIG. 3 is a schematic view of a reactor unit with a coolant jacket.

In another embodiment shown in FIG. 3, coolant jacket 31 is mounted on an upper outer wall of reactor 1.

Figure 4:
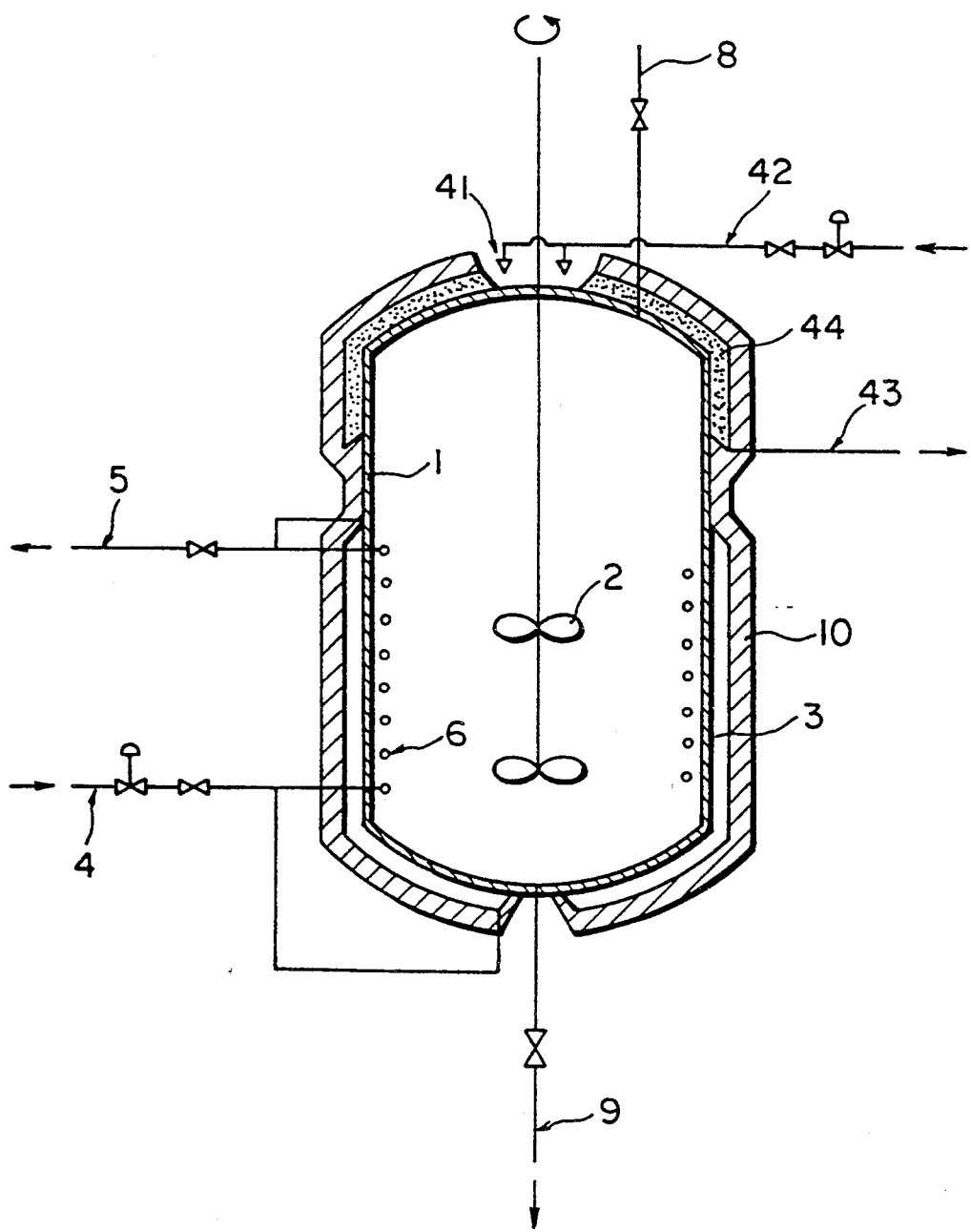
FIG. 4 is a schematic view of a reactor unit with a for spraying a liquid.

In another embodiment shown in FIG. 4, water is supplied via conduit 42 and sprayed via nozzles 41 directly to the upper outer wall of reactor 1. The sprayed water flows down slowly in a porous support for a heat insulating material, 44, for instance, spongy layer made of stainless steel, and is drawn via conduit 43.

Figure 5:
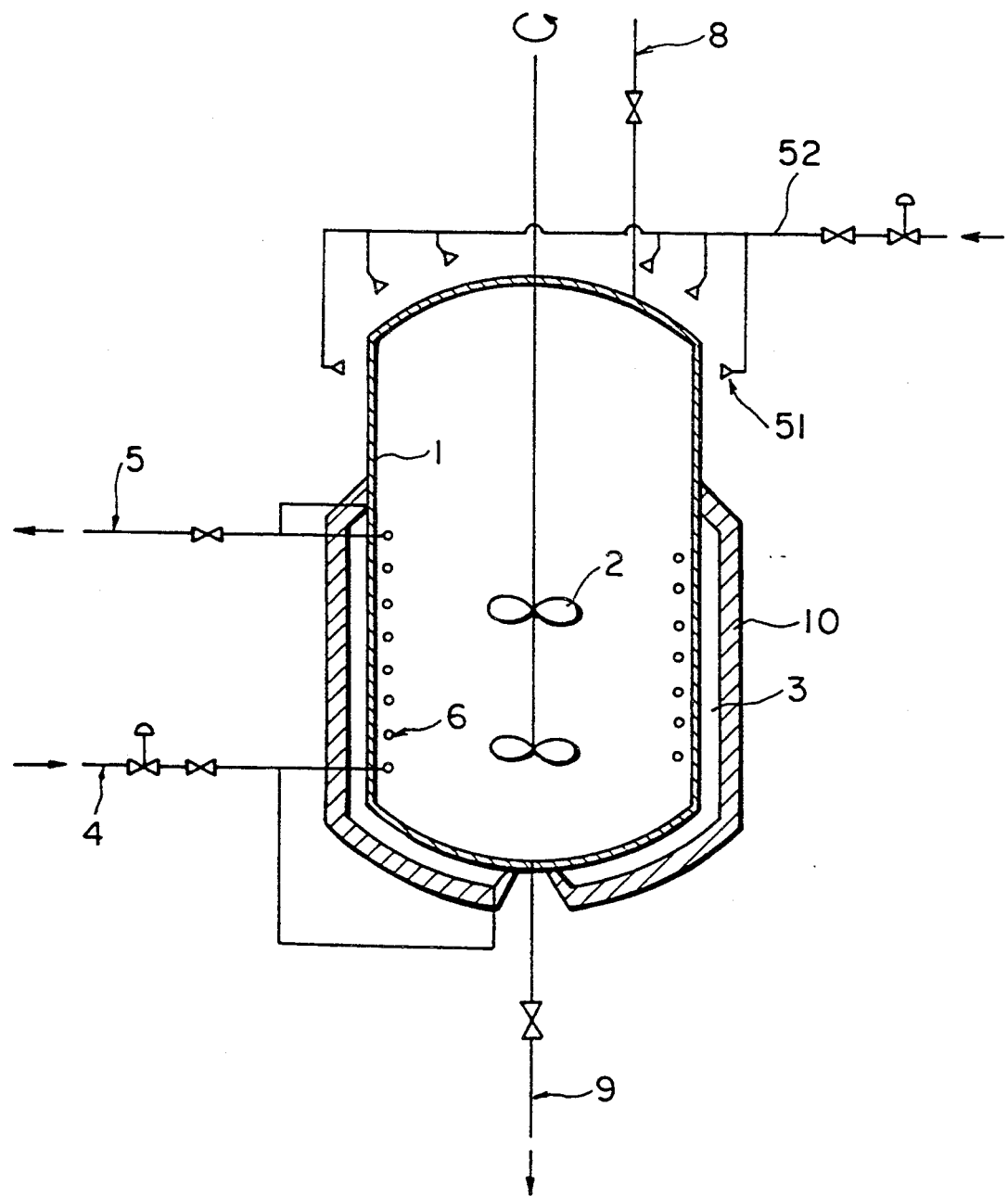
FIG. 5 is a schematic view of a reactor unit with a unit for blowing a gas.

In another embodiment shown in FIG. 5, there is no heat insulating material on the upper part of reactor 1, where the wall of the reactor is exposed. Pressurized air is supplied via conduit 52, and blown via nozzles 51 to the upper external wall of the reactor.

A slurry containing polyphenylene sulfide prepared in the apparatus according to the invention is taken out via conduit 9, separated from by-products in conventional steps, and dried.

Amide solvents to be used in the invention are those known for polymerization of polyphenylene sulfide and include, for instance, N-methyl pyrrolidone (hereinafter, NMP), N, N-dimethyl formamide, N, N-dimethyl acetamide, N-methyl caprolactame and the like, and mixtures thereof with NMP being preferred. All of these have vapor pressure lower than that of water.

Alkali metal sulfides to be used in the invention are also known and include, for instance, lithium sulfide, sodium sulfide, potassium sulfide, rubidium sulfide and mixtures thereof. These may be hydrated or in a form of aqueous solution. Alternatively, hydrosulfides or hydrates thereof corresponding to these may be converted into the corresponding sulfides with each corresponding hydroxide and used. Sodium sulfide which is less expensive is preferred.

Dihaloaramatic compounds to be used in the invention may be selected from ones described in Japanese Patent Publication 3368/1970. p-Dichlorobenzene is preferred. Further, a small amount (20 mole % or less) of one or more of m-dihobenzen, o-dihalobenzen, dihalogenated dyphenyl ether, diphenyl sulfone and biphenyl may be used to prepare copolymers, such as m-dichlorobenzene, o-dichlorobenzene, p,p'-dichlorodiphenyl ether, m,p'-dichlorodiphenyl ether, m,m'-dichlorodiphenyl ether, p,p'-dichlorodiphenyl sulfone, m,p'-dichlorodiphenyl sulfone, m,m'-dichlorodiphenyl sulfone, p,p'-dichlorobiphenyl, m,p'-dichlorobiphenyl and m,m'-dichlorobiphenyl.

Small amounts of additives, such as monohalogenated compounds as an end group terminator or modifier, may be used.

Preparation of Higher Molecular Weight Polyarylene Sulfide With A Polyhaloaromatic Compound.

Higher molecular weight polyarylene sulfide is prepared by adding a polyhaloaromatic compound as a comonomer in a reaction system in the present invention.

In this embodiment, a whole water content in a reaction system is preferably less than 1.7 moles, more preferably 0.8 to 1.2 moles, per mole of alkali metal sulfide. If it exceeds 1.7 moles, side reactions occur noticeably. Amounts of by-products, such as phenol, in a reaction product increases with the increasing water content of the reaction system. Polymerization degree is low, too. If the water content is less than 0.8 mole, a reaction rate is too fast to attain desired higher molecular weight.

A polyhaloaromatic compound is used in an amount of 0.005 to 1.5 mole %, preferably 0.02 to 0.75 mole %, based on alkali metal sulfide. If it is less than 0.005 mole %, the effect of addition of a polyhaloaromatic compound is not seen. If it exceeds 1.5 mole %, viscosity of polyarylene sulfide at melt is extremely high. Therefore, gel-like substances appear in molding and, further, moldability is poor. The polyhaloaromatic compound may be added together with a dihaloaromatic compound in a reaction system, or may be added any time in the middle course of reaction.

Polyhaloaromatic compounds to be used in the invention have at least three halogen substitutes in molecule and include, for instance, 1,2,3-trichlorobenzene, 1,2,4-trichlorobenzene, 1,3,5-trichlorobenzene, 1,3-dichloro-5-bromobenzene, 2,4,6-trichlorotoluene, 1,2,3,5-tetrabromobenzene, hexachlorobenzene, 1,3,5-trichloro-2,4-6trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof. 1,2,4-trichlorobenzene and 1,3,5-trichlorobenzene are preferred. and mixtures thereof. 1,2,4-trichlorobenzene and 1,3,5-trichlorobenzene are preferred.

EXAMPLE

The invention will be further explained hereinafter in reference to the following Examples.

In the Examples and Comparison Examples, a molecular weight is a peak-top molecular weight which is obtained as follows: a retention time determined at 210° C. in gel permeation chromatography using 1-chloro naphthalene as a mobile phase is converted into a molecular weight based on standard polystyrene which is then compensated in the Universal Calibration Method. The apparatus used was type SSC-7000 available from Senshu Kagaku. However, a weight average molecular weight was given in place of a peak-top molecular weight in Examples 9 to 16 and Comparison Examples 7 to 11.

EXAMPLE 1

In a 150 liters autoclave provided with an external cooling coil as shown in FIG. 1 were charged 19 . 253 kg of flaky sodium sulfide ($Na_2S$ content of 60.8% by weight) and 45.0 kg of N-methyl-2-pyrrolidone (hereinafter referred to as NMP). The temperature was elevated to 204° C. in a flow of nitrogen under stirring to distill off 4.442 kg of water. The autoclave was then sealed and cooled to 180° C., in which 21.940 kg of para- dichloro benzene (hereinafter referred to as p-DCB) and 18.0 kg of NMP were charged. After pressurizing it to 1 $kg/cm^2G$ (i.e., gauge pressure) with nitrogen gas at a liquid temperature of 150° C., the temperature was raised. Stirring was continued at a liquid temperature of 220° C. for three hours, while a coolant of 20° C. was passed in a coil which was wound on the upper part of the outside of the autoclave to cool it. Then, the liquid temperature was raised and stirring was continued at a liquid temperature of 260° C. for three hours. Subsequently, the temperature was lowered and, at the same time, the cooling of the upper part of the autoclave was stopped. The maximum pressure during the reaction was 8.71 $kg/cm^2G$.

The slurry obtained was filtered and washed with warm water repeatedly in a conventional method, and then dried at 120° C. for 4.5 hours to obtain a white powdery product. The molecular weight of the polyphenylene sulfide thus obtained was 42,000. The conversion, 100- (weight of p-DCB remained/weight of p-DCB charged)×100, was 98.4 Thiophenol was not detected in the reaction product. The detection of thiophenol was conducted by gas chromatography.

EXAMPLE 2

In a 4 $m^3$ autoclave provided with water sprinkling nozzles as shown in FIG. 4 were charged 513.4 kg of flaky sodium sulfide ($Na_2S$ content of 60.3% by weight) and 1190 kg of NMP. The temperature was elevated to 204° C. in a flow of nitrogen under stirring to distill off 111.3 kg of water. The autoclave was then sealed and cooled to 180° C., in which 583.1 kg of p-DCB and 400 kG of NMP were charged. After pressurizing it to 1 kg/cm$^2$G with nitrogen gas at a liquid temperature of 150° C., the temperature was raised. Stirring was continued at a liquid temperature of 215° C. for five hours, while water was sprinkled to the upper part of the autoclave to cool it. Then, the temperature was raised and stirring was continued at a liquid temperature of 255° C. for four hours. The temperature was lowered and, at the same time, the cooling of the upper part of the autoclave was stopped. The maximum pressure during the reaction was 9.2 kg/cm$^2$G.

The slurry obtained was filtered and washed with warm water repeatedly in a conventional method, and then dried in a dryer of 130° C. to obtain a white powdery product. The molecular weight of the polyphenylene sulfide thus obtained was 46,500. The conversion was 98.6%. Thiophenol was not detected in the reaction product.

EXAMPLE 3

In a 150 liters autoclave provided with eight air-blowing nozzles as shown in FIG. 5 were charged 19.253 kg of flaky sodium sulfide (Na$_2$S content of 60.8% by weight) and 45.0 kg of NNP. The temperature was elevated to 204° C. in a flow of nitrogen under stirring to distill off 4.074 kg of water. The autoclave was then sealed and cooled to 180° C., in which 21.940 kg of p-DCB and 18.0 kg of NMP were charged. After pressurizing it to 1 kg/cm$^2$G with nitrogen gas at a liquid temperature of 150° C., the temperature was raised. After the liquid temperature reached 240° C., an air flow of 15° C. was blown at a flow rate of 20 liters/min. via. eight nozzles to the upper part of the autoclave in which a heat insulating material was removed. Stirring was continued at a liquid temperature of 250° C. for two hours. The temperature was lowered and, at the same time, the cooling of the upper part of the autoclave was stopped. The maximum pressure during the reaction was 8.89 kg/cm$^2$G.

The slurry obtained was filtered and washed with warm water repeatedly in a conventional method, and then dried at 120° C. for 4.5 hours to obtain a white powdery product. The molecular weight of the polyphenylene sulfide thus obtained was 30,300. The conversion was 98.6% Thiophenol was not detected in the reaction product.

COMPARISON EXAMPLE 1

Polymerization was carried out as in Example 1 with the exception that no coolant was passed in the external cooling coil. The maximum pressure during the reaction was 10.3 kg/cm$^2$G. The polymer obtained had a molecular weight of 27,500 and the conversion was 99.0%. It was found that thiophenol was present in a concentration of 200 ppm in the reaction product.

COMPARISON EXAMPLE 2

Polymerization was carried out as in Example 1 with the exception that a heating medium of 270° C. was passed in the external cooling coil. The maximum pressure during the reaction was 11.2 kg/cm$^2$G. The polymer obtained had a molecular weight of 22,000 and the conversion was 99.1% The polymer obtained was little brownish white powder. It was found that thiophenol was present in a concentration of 400 ppm in the reaction product.

COMPARISON EXAMPLE 3

The same procedure as in Example 2 was repeated with the exception that water was not sprinkled to the upper part of the autoclave. The maximum pressure during the reaction was 10.8 kg/cm$^2$G. The polymer obtained had a molecular weight of 23,500 and the conversion was 99.0%. It was found that thiophenol was present in a concentration of 250 ppm in the reaction product.

EXAMPLE 4

In a 3 liters autoclave provided with air-blowing nozzles as shown in FIG. 5 were charged 388.3 g of flaky sodium sulfide (Na$_2$S content of 60.3 % by weight) and 900 g of NMP. The temperature was elevated to 204° C. in a flow of nitrogen under stirring to distill off 81.2 g of water. The autoclave was then sealed and cooled to 180° C., to which a solution of 436.6 g of p-DCB and 4.4 g of meta-dichloro benzene dissolved in 240 g of NMP was added. After pressurizing it to 1 kg/cm$^2$G with nitrogen gas at a liquid temperature of 150° C., the temperature was raised. Stirring was continued at a liquid temperature of 215° C. for 5.5 hours, while an air flow was blown via four nozzles to the upper part of the autoclave to cool it. Then, the temperature was raised and stirring was continued at a liquid temperature of 250° C. for three hours. Subsequently, the temperature was lowered and, at the same time, the cooling of the upper part of the autoclave was stopped. The maximum pressure during the reaction was 8.18 kg/cm$^2$G.

The slurry obtained was filtered and washed with warm water repeatedly in a convent tonal method, and then dried in an oven of 120° C. for 5 hours to obtain a white powdery product. The molecular weight of the product was 37,600. The conversion was 98.8%. Thiophenol was not detected in the reaction product.

COMPARISON EXAMPLE 4

The same procedure as in Example 3 was repeated with the exception that the air flow was not blown to the upper part of the autoclave which part was covered with a heat insulating material. The maximum pressure during the reaction was 10.8 kg/cm$^2$G. The polymer obtained had a molecular weight of 26,500 and the conversion was 98.9%. It was found that thiophenol was present in a concentration of 140 ppm in the reaction product.

EXAMPLE 5

In a 4 m$^3$ autoclave provided with water-sprinkling nozzles as shown in FIG. 4 were charged 513.4 kg of flaky sodium sulfide (Na$_2$S content of 60.8% by weight) and 1190 kg of NMP. The temperature was elevated to 204° C. in a flow of nitrogen under stirring to distill off 111.3 kg of water. The autoclave was then sealed and cooled to 180° C., in which 583.1 kg of p-DCB and 400 kg of NMP were charged. After pressurizing it to 1 kg/cm$^2$G with nitrogen gas at a liquid temperature of 150° C., the temperature was raised. After the liquid temperature reached 240° C., water was sprinkled to the upper part of the autoclave to cool it. Then the temperature was raised and stirring was continued at a liquid temperature of 255° C. for two hours. Subsequently, the temperature was lowered and, at the same time, the cooling of the upper part of the autoclave was stopped.

The maximum pressure during the reaction was 9.4 kg/cm²G.

The slurry obtained was filtered and washed with warm water repeatedly in a conventional method, and then dried in a dryer of 130° C. to obtain a white powdery product. The molecular weight of the polyphenylene sulfide thus obtained was 31,500. The conversion was 99.1%. Trace of thiophenol was detected in the reaction product.

COMPARISON EXAMPLE 5

The same procedure as in Example 5 was repeated with the exception that water was not sprinkled to the upper part of the autoclave. The maximum pressure during the reaction was 11.0 kg/cm²G. The polymer obtained had a molecular weight of 23,800 and the conversion was 99.3%. It was found that thiophenol was present in a concentration of 220 ppm in the reaction product.

EXAMPLE 6

A 4 m³ autoclave was used. Its upper external part above a liquid level was not covered with a heat insulating material and exposed to air. An atmospheric temperature was 20.3° C. The lower external part below a liquid level was covered with a heating jacket which was in turn covered with refractory bricks for thermal insulation. In the above autoclave were charged 512.2 kg of flaky sodium sulfide (Na₂S content of 60.3% by weight) and 1200 kg of NMP. The temperature was elevated to 204° C. in a flow of nitrogen under stirring to distill off 104.1 kg of water. The autoclave was then sealed and cooled to 180° C., in which 577.4 kg of p-DCB and 400 kg of NMP were charged. After pressurizing it to 1 kg/cm²G with nitrogen gas at a liquid temperature of 150° C., the temperature was raised. Stirring was continued at a liquid temperature of 215° C. for five hours. Then, the temperature was raised and stirring was continued at a liquid temperature of 255° C. for four hours. Subsequently, the temperature was lowered. The maximum pressure during the reaction was 9.8 kg/cm²G.

The molecular weight of a white powdery product thus obtained was 41,700. The conversion was 98.7%. Thiophenol was detected in a concentration of 20 ppm in the reaction product.

COMPARISON EXAMPLE 6

The same procedure as in Example 6 was repeated with the except ion that the whole reaction apparatus was heat insulated with refractory bricks. The maximum pressure during the reaction was 10.3 kg/cm²G. The slurry obtained was filtered and washed with warm water repeatedly in a conventional method, and then dried in a dryer of 130° C. to obtain a white powdery product. The molecular weight of the polyphenylene sulfide thus obtained was 25,000. The conversion was 99.1%. Thiophenol was detected in a concentration of 280 ppm in the reaction product.

EXAMPLE 7

In a 150 liters autoclave provided with an internal cooling coil as shown in FIG. 2 were charged 16.825 kg of flaky sodium sulfide (Na₂S content of 60.3% by weight) and 39.0 kg of NMP. The temperature was elevated to 204° C. in a flow of nitrogen under stirring to distill off 3.627 kg of water. The autoclave was then sealed and cooled to 180° C., in which 19.206 kg of p-DCB and 15.6 kg of NMP were charged. After pressurizing it to 1 kg/cm²G with nitrogen gas at a liquid temperature of 150° C., the temperature was raised.

Stirring was continued for 6 hours while a liquid temperature was maintained at 215° C., and then the temperature was raised again. After the temperature reached 220° C., a coolant of 20° C. was passed in the internal cooling coil. The liquid temperature was raised up to 250° C. and stirring was continued at that temperature for 3 hours. Subsequently, the temperature was lowered and, at the same time, the flow of the coolant in the internal cooling coil was stopped. The maximum pressure during the reaction was 8.61 kg/cm²G.

The slurry obtained was treated as in Example 1 to obtain a white powdery product. The molecular weight of the polyphenylene sulfide thus obtained was 44,500. The conversion was 99.2%. Thiophenol was not detected in the reaction product.

COMPARISON EXAMPLE 7

Polymerization was carried out as in Example 7 with the exception that no coolant was passed in the internal cooling coil. The maximum pressure during the reaction was 10.9 kg/cm²G. The polymer thus obtained had a molecular weight of 27,000 and the conversion was 98.8%. It was found that thiophenol was present in a concentration of 175 ppm in the reaction product.

EXAMPLE 8

In a 2 m³ autoclave provided with a coolant jacket as shown in FIG. 3 were charged 256.7 kg of flaky sodium sulfide (Na₂S content of 60.8% by weight) and 600 kg of NMP. The temperature was elevated to 204° C. in a flow of nitrogen under stirring to distill off 57.6 kg of water. The autoclave was then sealed and cooled to 180° C., in which 293.1 kg of p-DCB and 200 kg of NMP were charged. After pressurizing it to 1 kg/cm²G with nitrogen gas at a liquid temperature of 150° C., the temperature was raised. Stirring was continued at a liquid temperature of 20° C. for 4.5 hours, while a coolant of 20° C. was passed in the jacket. Then, the liquid temperature was raised and stirring was continued at a liquid temperature of 255° C. for three hours. Subsequently, the temperature was lowered and, at the same time, the cooling of the upper part of the autoclave was stopped. The maximum pressure during the reaction was 8.55 kg/cm²G.

The slurry obtained was filtered and washed with warm water repeatedly in a conventional method, and then dried in a dryer of 130° C. to obtain a white powdery product. The molecular weight of the polyphenylene sulfide thus obtained was 48,300. The conversion was 98.9%. Thiophenol was not detected in the reaction product.

EXAMPLE 9

In a 150 liters autoclave as shown in FIG. 4 were charged 19.478 kg of flaky sodium sulfide (Na₂S content of 60.1% by weight) and 45.0 kg of NMP. The temperature was elevated to 204° C. in a flow of nitrogen under stirring to distill off 4.856 kg of water (the content of water remained being 1.08 moles per mole of sodium sulfide). The autoclave was then sealed and cooled to 180° C., in which 21.940 kg of p-DCB and 18.0 kg of NMP were charged. After pressurizing it to 1 kg/cm²G with nitrogen gas at a liquid temperature of 150° C., the temperature was raised. Stirring was continued at a liquid temperature of 215° C. for 7 hours, while water was sprinkled on the upper part of the outside of the autoclave to cool a gas phase part of the autoclave. Then, 108.9 g of 1,3,5-trichlorobenzene (about 0.4 mole % based on sodium sulfide) in 500 g of NMP were introduced into the autoclave by pressure with a small high pressure pump. Then, the temperature was raised and stirring was continued at a liquid temperature of 260° C. for three hours. Subsequently, the temperature was lowered and, at the same time, the sprinkling of water on the upper part of the autoclave was stopped. The maximum pressure during the reaction was 8.89 kg/cm$^2$G.

The slurry obtained was filtered and washed with warm water repeatedly in a conventional method, and then dried in an oven of 120° C. for 5 hours to obtain a white powdery product. The weight average molecular weight of the polyphenylene sulfide thus obtained was 81,600. The conversion was 99.0%. Thiophenol was not detected in the reaction product.

EXAMPLE 10

The same procedure as in Example 9 was repeated with the exception that 21.8 g of 1,3,5-trichlorobenzene (about 0.08 mole % based on sodium sulfide) was used. The maximum pressure during the reaction was 8.87 kg/cm$^2$G. The weight average molecular weight of the white powdery polyphenylene sulfide obtained was 51,500. The conversion was 99.2%. Thiophenol was not detected in the reaction product.

EXAMPLE 11

In a 150 liters autoclave as shown in FIG. 5 were charged 19.478 kg of flaky sodium sulfide (Na$_2$S content of 60.1% by weight) and 45.0 kg of NMP. The temperature was elevated to 204° C. in a flow of nitrogen under stirring to distill off 5.180 kg of water (the content of water remained being 0.96 mole per mole of sodium sulfide). The autoclave was then sealed and cooled to 180° C., in which 21.940 kg of p-DCB and 18.0 kg of NMP were charged. After pressurizing it to 1 kg/cm$^2$G with nitrogen gas at a liquid temperature of 150° C., the temperature was raised. Stirring was continued at a liquid temperature of 215° C. for 7 hours, while a coolant of 20° C. was passed in a coil which was attached to the upper part of the outside of the autoclave to cool a gas phase part of the autoclave. Then, 108.9 g of 1,2,4-trichlorobenzene (about 0.4 mole % based on sodium sulfide) in 500 g of NMP were introduced into the autoclave by pressure with a small high pressure pump. Then, the temperature was raised and stirring was continued at a liquid temperature of 260° C. for three hours. Subsequently, the temperature was lowered and, at the same time, the cooling of the upper part of the autoclave was stopped. The maximum pressure during the reaction was 8.71 kg/cm$^2$G.

The slurry obtained was filtered and washed with warm water repeatedly in a conventional method, and then dried in an oven of 120° C. for 5 hours to obtain a white powdery product. The weight average molecular weight of the polyphenylene sulfide thus obtained was 77,200. The conversion was 99.1%. Thiophenol was not detected in the reaction product.

EXAMPLE 12

The same procedure as in Example 11 was repeated with the exception that 40.8 g of 1,2,4-trichlorobenzene (about 0.15 mole % based on sodium sulfide) was used. The maximum pressure during the reaction was 8.73 kg/cm$^2$G. The weight average molecular weight of the white powdery polyphenylene sulfide obtained was 56,700. The conversion was 99.2%. Thiophenol was not detected in the reaction product.

EXAMPLE 13

In a 150 liters autoclave as shown in FIG. 1 were charged 19.478 kg of flaky sodium sulfide (Na$_2$S content of 60.1% by weight) and 45.0 kg of NMP. The temperature was elevated to 204° C. in a flow of nitrogen under stirring to distill off 5.072 kg of water (the content of water remained being 1.0 mole per mole of sodium sulfide). The autoclave was then sealed and cooled to 180° C., in which 21.984 kg of p-DCB, 18.0 kg of NMP and 40.8 g of 1,2,4-trichlorobenzene (about 0.15 mole % based on sodium sulfide) were charged. After pressurizing it to 1 kg/cm$^2$G with nitrogen gas at a liquid temperature of 150° C., the temperature was raised. Stirring was continued at a liquid temperature of 215° C. for 7 hours, while a coolant of 20° C. was passed in a coil which was attached to the upper part of the outside of the autoclave to cool a gas phase part of the autoclave. Then, the temperature was raised and stirring was continued at a liquid temperature of 260° C. for three hours. Subsequently, the temperature was lowered and, at the same time, the cooling of the upper part of the autoclave was stopped. The maximum pressure during the reaction was 8.69 kg/cm$^2$G.

The slurry obtained was filtered and washed with warm water repeatedly in a conventional method, and then dried in an oven of 120° C. for 5 hours to obtain a white powdery product. The weight average molecular weight of the polyphenylene sulfide thus obtained was 60,800. The conversion was 99.1%. Thiophenol was not detected in the reaction product.

EXAMPLE 14

The same procedure as in Example 13 was repeated with the exception that 54.5 g of 1,3,5-trichlorobenzene (about 0.2 mole % based on sodium sulfide) was used in place of 1,2,4-trichlorobenzene. The maximum pressure during the reaction was 8.72 kg/cm$^2$G. The weight average molecular weight of the white powdery polyphenylene sulfide obtained was 70,800. The conversion was 98.8%. Thiophenol was not detected in the reaction product.

EXAMPLE 15

In a 4 m$^3$ autoclave as shown in FIG. 4 were charged 512. 9 kg of flaky sodium sulfide (Na$_2$S content of 60.1% by weight) and 1200 kg of NMP. The temperature was elevated to 204° C. in a flow of nitrogen under stirring to distill off 131.6 kg of water (the content of water remained being 1.05 mole % per mole of sodium sulfide). The autoclave was then sealed and cooled to 180° C., in which 583. 6 kg of p-DCB, 400 kg of NMP and 1.851 kg of 1,2,4-trichlorobenzene (about 0.25 mole % based on sodium sulfide) were charged. After pressurizing it to 1 kg/cm$^2$G with nitrogen gas at a liquid temperature of 150° C., the temperature was raised. After the liquid temperature reached 230° C., water was sprinkled on the upper external part of the autoclave to cool the gas phase part of the autoclave. Subsequently, the temperature was raised to 260° C. and maintained at that temperature for three hours. Then the temperature was lowered and, at the same time, the sprinkling of water was stopped. The maximum pressure during the reaction was 8.82 kg/cm$^2$G.

The slurry obtained was filtered and washed with warm water repeatedly in a conventional method, and then dried in an oven of 120° C. for 5 hours to obtain a white powdery product. The weight average molecular weight of the polyphenylene sulfide thus obtained was 53,800. The conversion was 98.7%. Thiophenol was not detected in the reaction product.

COMPARISON EXAMPLE 7

The same procedure as in Example 9 was repeated with the exception that the sprinkling of water on the upper external part of the autoclave was not conducted. The maximum pressure during the reaction was 10.5 kg/cm$^2$G. The weight average molecular weight of the polyphenylene sulfide thus obtained was 32,500. The conversion was 99.3%. It was found that thiophenol was present in a concentration of 150 ppm in the react ion product.

COMPARISON EXAMPLE 8

The same procedure as in Example 9 was repeated with the exception that the amount of 1,3,5-trichlorobenzene was 326.8 g (1.6 mole % based on sodium sulfide). The maximum pressure during the react ion was 8.70 kg/cm$^2$G. The polyphenylene sulfide thus obtained was not completely dissolved in 1-chloronaphthalene and, therefore, the molecular weight could not be determined. The conversion was 98.6%. Thiophenol was not detected in the reaction product. It was impossible to determine a melt viscosity at 300° C. because of too high viscosity.

COMPARISON EXAMPLE 9

The same procedure as in Example 10 was repeated with the exception that 83.8 kg of water was distilled off during the dehydration step (the content of water remained being 1.75 moles per mole of sodium sulfide) and that the sprinkling of water on the upper external part of the autoclave was not conducted. The maximum pressure during the reaction was 13.7 kg/cm$^2$G. The polyphenylene sulfide thus obtained was brownish white powder. The weight average molecular weight was 18,400 and the conversion was 99.6% It was found that thiophenol was present in a concentration of 1,120 ppm in the reaction product.

COMPARISON EXAMPLE 10

The same procedure as in Example 13 was repeated with the exception that the coolant was not passed in the coil attached to the upper external part of the autoclave. The maximum pressure during the reaction was 10.8 kg/cm$^2$G. The polyphenylene sulfide thus obtained was little brownish white powder. The weight average molecular weight was 33,600 and the conversion was 99.2%. It was found that thiophenol was present in a concentration of 140 ppm in the reaction product.

COMPARISON EXAMPLE 11

The same procedure as in Example 13 was repeated with the exception that 1,2,4-trichlorobenzene was not added. The maximum pressure during the reaction was 8.69 kg/cm$^2$G. The weight average molecular weight of the polyphenylene sulfide was 42,800. The conversion was 99.2%. Thiophenol was not detected in the reaction product.

EXAMPLE 16

In a 150 liters autoclave as shown in FIG. 1 were charged 19.478 kg of flaky sodium sulfide (Na$_2$S content of 60.1% by weight) and 45.0 kg of NMP. The temperature was elevated to 204° C. in a flow of nitrogen under stirring to distill off 5.072 kg of water (the content of water remained being 1.0 mole per mole of sodium sulfide). The autoclave was then sealed and cooled to 180° C., in which 22.050 kg of p-DCB, 18.0 kg of NMP and 217.7 g of 1,2,4-trichlorobenzene (about 0.80 mole % based on sodium sulfide) were charged. After pressurizing it to 1 kg/cm$^2$G with nitrogen gas at a liquid temperature of 150° C., the temperature was raised. Stirring was continued at a liquid temperature of 205° C. for two hours, while a coolant of 20° C. was passed in a coil which was attached to the upper external part of the autoclave to cool the gas phase part of the autoclave. Then, the temperature was raised and stirring was continued for three hours with the liquid temperature being maintained at 265° C. Subsequently, the temperature was lowered and, at the same time, the cooling of the upper part of the autoclave was stopped. The maximum pressure during the reaction was 9.65 kg/cm$^2$G.

The slurry obtained was filtered and washed with warm water repeatedly in a conventional method, and then dried in an oven of 120° C. for 5 hours to obtain a white powdery product. The weight average molecular weight of the polyphenylene sulfide thus obtained was 97,500. The conversion was 99.4%. Thiophenol was not detected in the reaction product.

Evaluation of Processability

Spinnability was determined on the polyphenylene sulfides prepared in the above Examples 9 and 13 and Comparison Examples 7 and 8 as follows:

using a type IB capillograph (Toyo Seiki Seisakusho, L/D=10/1), the polyphenylene sulfide was melted at 320° C. and the strand from a die was wound at a predetermined constant speed, while a tension on the strand was determined.

Similar procedure was carried out with the winding speed being increased continuously and gradually from 5 m/min. The results are as shown in Table 1.

The polyphenylene sulfides having a high molecular weight prepared in the above Examples showed stable melt tension and less thread breakage in a wide range of a winding speed. Accordingly, they are judged to be suitable for fiber spinning and blow molding applications.

TABLE 1

| Sample | Mw | Melt tension* (g) | Speed range for stable winding (m/min) | Spinnability |
|---|---|---|---|---|
| Ex. 9 | 81,600 | 4.8 | 20–60 | good |
| Ex. 13 | 60,800 | 2.2 | 15–60 | acceptable |
| Comp. Ex. 7 | 32,500 | <0.4 | 20–60 | unsuitable |
| Comp. Ex. 8 | unable to determine | 19.8 | broken at 5 | unsuitable |

*The winding speed was 40 m/min. in Examples 9 and 13 and Comparison Example 7; and 5 m/min. in Comparison Example 8.

We claim:

1. A process for the preparation of polyarylene sulfide comprised of conducting a polymerization reaction in a reactor provided with cooling means by polymerizing an alkali metal sulfide with a dihaloaromatic compound in an organic amide solvent, wherein a part of a gaseous phase in the reactor is cooled by the cooling means to thereby condense part of a gaseous phase in the reactor to a liquid, and the condensed liquid is refluxed to a liquid phase in the reactor.

2. The process as claimed in claim 1, wherein the reaction is conducted in at least two steps having different temperatures.

3. The process as claimed in claim 1, wherein 0.005 to 1.5 mole percent, based on the alkali metal sulfide, of a polyhaloaromatic compound is further reacted.

4. The process as claimed in claim 3, wherein a water content in a reaction system is less than 1.7 mole per mole of the alkali metal sulfide.

5. The process as claimed in claim 3, wherein the reaction is conducted in at least two steps having different temperatures.

* * * * *